(12) United States Patent
Asukabe et al.

(10) Patent No.: US 6,224,994 B1
(45) Date of Patent: May 1, 2001

(54) SOLID POLYELECTROLYTE-TYPE FUEL CELL

(75) Inventors: Michio Asukabe; Chiaki Yamada; Michiaki Katoh; Shinji Nezu, all of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/232,904

(22) Filed: Jan. 19, 1999

(30) Foreign Application Priority Data

Jan. 19, 1998 (JP) .................................................. 10-007918

(51) Int. Cl.[7] .................................................... H01M 8/10
(52) U.S. Cl. .............................. 429/33; 429/30; 180/65.3
(58) Field of Search ........................ 429/30–33; 180/65.3

(56) References Cited

U.S. PATENT DOCUMENTS 5,501,264 * 3/1996 Harada et al. .......................... 164/97
5,780,179 * 7/1998 Okamoto ................................ 429/30
5,817,718 * 10/1998 Nezu et al. ........................... 429/130

FOREIGN PATENT DOCUMENTS

| 57-60670 | * 4/1982 | (JP) | ........................................ 429/33 |
| 61-279065 | * 12/1986 | (JP) | ........................................ 429/33 |
| 6-231780 | 8/1994 | (JP) . | |
| 7-300400 | * 11/1995 | (JP) . | |

* cited by examiner

Primary Examiner—Mark F. Huff
Assistant Examiner—Daborah Chacko-Davis
(74) Attorney, Agent, or Firm—Oblon, Spivak, McClelland, Maier & Neustadt, P.C.

(57) ABSTRACT

A solid polyelectrolyte membrane for a fuel cell includes (a) a hydrocarbon polymer grafted fluorine polymer, which contains sulfonic acid groups, and (b) whisker fibers, fixed to the grafted fluorine polymer. The fiber may be surface-treated with a silane coupling agent which reacts with the fluorine polymer and the fibers, prior to graft-copolymerization.

32 Claims, No Drawings

SOLID POLYELECTROLYTE-TYPE FUEL CELL

BACKGROUND OF THE INVENTION

1. Field of the Invention

The present invention relates to a solid polyelectrolyte-type fuel cell.

2. Discussion of the Background

A solid polyelectrolyte-type fuel cell is considered to be a hopeful, small-sized lightweight power source for vehicles and other devices, in which hydrogen and oxygen are used as the fuel. The cell comprises an ion-exchangeable, solid polyelectrolyte membrane, and positive and negative electrodes disposed to be in contact with both sides of the membrane. The hydrogen fuel is electrochemically oxidized at the negative electrode to give protons and electrons. The protons pass through the polyelectrolyte membrane toward the positive electrode to which oxygen is fed. Electrons having been formed at the negative electrode, travel to the positive electrode, where the protons and the electrons react with oxygen to form water.

The solid electrolyte-type fuel cell can operate at low temperatures and is small-sized, while producing a high output density. Therefore, many studies have been made on these types of cells for use as the power source for vehicles. In the cell, sulfonic acid group-containing perfluorocarbon polymer membranes (e.g., NAFION, trade name of DUPONT Co.; ACIPLEX, trade name of ASAHI CHEMICAL Co.) or the like have been generally used as the polyelectrolyte membrane. However, the conventional fuel cell is not still satisfactory as its output is too low.

In order to increase the output of the cell, the hydrogen ion conductivity of the solid polyelectrolyte membrane therein must be increased to lower the internal resistance of the cell. For this, the concentration of the ion-exchanging groups (for example, sulfonic acid group) in the solid polyelectrolyte membrane may be increased and the thickness of the membrane may be reduced. However, too great an increase in the ion-exchanging group concentration in the membrane results in an increase in the water content of the membrane to an undesirable degree, and is therefore problematic in that the positive electrode at which water is formed through the cell reaction becomes too wet, lowering the cell output.

On the other hand, a reduction in the thickness of the membrane is also problematic in that the mechanical strength of the membrane is reduced and the amount of the fuel (hydrogen gas and oxygen gas) passing through the membrane is increased, lowering the cell-out efficiency.

In order to solve these problems, Japanese Patent Application Laid-Open (JP-A) Hei-6-231780 proposed a casting method comprising infiltrating a sulfone-type perfluorocarbon polymer into woven fabric of polytetrafluoroethylene followed by drying and filming it around the fabric; and a method comprising hot-melting a sulfone-type perfluorocarbon polymer on woven fabric of polytetrafluoroethylene under pressure. In these methods, the object was to reinforce the polymer film.

However, in the casting method, adhesion between the woven fabric and the sulfone-type perfluorocarbon polymer is weak; and in the pressure hot-melting method, the fabric and the sulfone-type perfluorocarbon polymer are only partially fused and adhered together, but are not completely integrated. In JP-A Hei-6-23 1780, fibrils of polytetrafluoroethylene are mixed with a sulfone-type perfluorocarbon polymer and extruded into sheets, in place of using woven fabric of polytetrafluoroethylene. In this method, however, the melting point of polytetrafluoroethylene is so high that the sulfone-type perfluorocarbon polymer mixed with its fibrils could not be completely fused and integrated.

When the membranes as produced according to the proposed methods are used in fuel cells, the sulfone-type perfluorocarbon polymer is separated from the fibrils or woven fabric of polytetrafluoroethylene while the cells are driven, resulting in the membranes not maintaining their initial mechanical strength. In addition, where the woven fabric is used as the reinforcing material, its thickness is often uneven, and the reduction in its thickness is limited.

SUMMARY OF THE INVENTION

The present invention has solved the problems noted above, and produces a solid polyelectrolyte membrane by introducing a sulfonic acid group into a hydrocarbon polymer grafted with a fluorine polymer, in which the fluorine polymer is reinforced with whisker fibers, which have been surface-treated with a silane coupling agent. In the membrane of the invention, the reinforcing whisker fibers are firmly adhered and fixed to the membrane. Therefore, when the membrane is in a fuel cell, the whisker fibers in the membrane do not peel off and the mechanical strength of the membrane is not reduced while the fuel cell is driven. In addition, since the fluorine polymer is a thermoplastic polymer, the membrane of the polymer may have any desired thickness. The invention thus provides a solid polyelectrolyte-type fuel cell, in which the solid polyelectrolyte membrane have various advantages.

For solving the technical problems noted above, the invention provides a solid polyelectrolyte-type fuel cell comprising a solid polyelectrolyte membrane, which is characterized in that the solid polyelectrolyte membrane in the cell is produced by graft-copolymerizing a fluorine polymer with a hydrocarbon polymer, followed by introducing a sulfonic acid group into the resulting copolymer, and the fluorine polymer is reinforced with fibers surface-treated with a silane coupling agent.

DETAILED DESCRIPTION OF THE INVENTION

In one embodiment of the solid polyelectrolyte-type fuel cell of the invention, the silane coupling agent is represented by:

wherein:

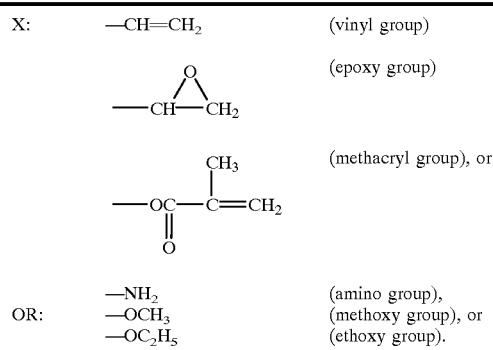

The silane coupling agent used in this embodiment reacts with both the fibers and the fluorine polymer, whereby the fibers are firmly adhered to the polymer and exhibit a strong reinforcing effect. Therefore, the mechanical strength of the solid polyelectrolyte membrane is high.

In another embodiment of the solid polyelectrolyte-type fuel cell of the invention, the silane coupling agent reacts with the fluorine polymer and the fibers, and is added in an amount of from 1 to 5 parts by weight relative to 100 parts by weight of the fluorine polymer.

If the amount of the silane coupling agent added is smaller than 1 part by weight, the adhesiveness of the fibers to the polymer is poor. However, if the amount is larger than 5 parts by weight, the electric resistance of the solid polyelectrolyte membrane is too high and the power output of the cell is reduced.

In still another embodiment of the solid polyelectrolyte-type fuel cell of the invention, the fibers are whisker fibers having a fiber diameter of from 0.1 to 10 μm and an aspect ratio (fiber length/fiber diameter) of from 10 to 1000.

If the fiber diameter is smaller than 0.1 μm, the fibers become too entangled and are difficult to disperse. However, if the fiber diameter is larger than 10 μm, the fibers will protrude out of the surface of the membrane and the membrane may not have an even surface. If the aspect ratio is smaller than 10, the reinforcing effect of the fibers is poor. However, if the aspect ratio is larger than 1000, the fiber length is too long, and such long fibers will protrude out of the surface of the membrane and the membrane may not have an even surface.

In still another embodiment of the solid polyelectrolyte-type fuel cell of the invention, the amount of the fibers added is from 10 to 30 parts by weight relative to 100 parts by weight of the fluorine polymer.

If the amount of the fibers added is smaller than 10 parts by weight, the fibers in the membrane may not be entangled to a satisfactory degree, and may not exhibit a satisfactory reinforcing effect. If, however, the amount of the fibers added is larger than 30 parts by weight, the reinforced polymer may be difficult to sheet into films through extrusion. If so, in addition, the electric resistance of the solid polyelectrolyte membrane will be too high and the power output of the cell will be reduced.

In still another embodiment of the solid polyelectrolyte-type fuel cell of the invention, the fibers are selected from potassium titanate, calcium silicate, aluminium borate, sepiolite, silicon carbide, or mixtures thereof.

The whisker fibers in this embodiment are extremely thin, and therefore can exhibit a greater reinforcing effect than thick glass fibers of the same weight. Another advantage of these fibers is that they have little influence on the surface of the membrane.

In still another embodiment of the solid polyelectrolyte-type fuel cell of the invention, the fluorine polymer is represented by:

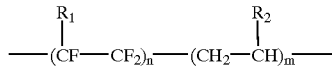

wherein $R_1$ represents a fluorine atom, or a fluoroalkyl group having from 1 to 3 carbon atoms; $R_2$ represents a hydrogen atom, or an alkyl group having from 1 to 3 carbon atoms; m represents an integer of 1 or more; and n represents an integer of 1 or more.

In still another embodiment of the solid polyelectrolyte-type fuel cell of the invention, the hydrocarbon polymer is represented by:

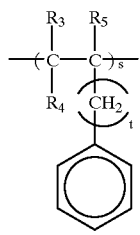

wherein $R_3$, $R_4$ and $R_5$ each represent a hydrogen atom, or an alkyl group having from 1 to 3 carbon atoms; s represents an integer of 1 or more; and t represents 0 or an integer of 1 or more.

EXAMPLES

Having generally described this invention, a further understanding can be obtained by reference to certain specific examples which are provided herein for purposes of illustration only and are not intended to be limiting unless otherwise specified.

Example 1

Potassium titanate fibers having a fiber diameter of 0.6 μm and an aspect ratio of 33 were treated with 1% by weight, relative to the weight of the fibers, of γ-methacryloxypropyltrimethoxysilane. These were mixed with 20% by weight of ethylene-tetrafluoroethylene copolymer melt, and extruded into a film having a thickness of 50 μm.

The film was washed with acetone, and exposed to 5 KGy of gamma rays, using cobalt 60 as the radiation source. The thus-exposed film was put into a 10 cm² glass reactor tube, to which was added 25 ml of styrene, and the reactor tube was fully purged with nitrogen. Next, the reactor tube was dipped in a thermostat tank at 60° C. for 19 hours. Afterwards, the film was washed three times with benzene, and dried in a drier. The dried film was dipped in a mixture comprised of 30 parts (by weight—the same shall apply hereinunder) of chlorosulfonic acid and 70 parts of 1,1,2,2-tetrachloroethane for 30 minutes, and then washed with 1,1,2,2-tetrachloroethane. The film was then washed with ion-exchanged water, and dipped in an aqueous solution of 2 N potassium hydroxide at 100° C. for 30 minutes. Next, the film was dipped in an aqueous solution of 1 N sulfuric acid at 100° C. for 30 minutes, and fully washed with ion-exchanged water. Thus was obtained a solid polyelectrolyte membrane.

The strength of the membrane was measured to be 5.0 kg/cm. Next, the membrane was sandwiched between gas-diffusion electrodes having a platinum content of 0.4 mg/cm², set in a hot press at 100IC, and pressed at that temperature under a pressure of 20 kg/cm² for 5 minutes, then at 130° C. under the same pressure for 5 minutes, then at 165° C. under the same pressure for 5 minutes, and under an increased pressure of 80 kg /cm² for 90 seconds, in that order. Thus was prepared an electrode-sandwiched membrane composite.

Using this membrane composite, a single cell was constructed. Oxygen was fed to the positive electrode of the cell while hydrogen was fed to the negative electrode, at a cell temperature of 70° C. and under one atmospheric pressure, and the terminal voltage relative to the current density was measured. In this case, the current density was 1 A/cm², and the cell voltage was 0.59 V. Considering the conditions for driving fuel cells in actual operation, the membrane prepared herein was dipped in hot water at 90° C. for 1000 hours, and its strength was measured to be 5.0 kg/cm. There was found no difference between the original strength of the membrane and the strength of the membrane having been subjected to the hot-dipping test. This supports the fact that no reinforcing fibers peeled off from the membrane during the test.

Comparative Example 1

The same ethylene-tetrafluoroethylene copolymer as that used in Example 1 was, without being mixed with potassium titanate fibers, sheeted through extrusion into a film having a thickness of 50 μm. This was then processed in the same manner as in Example 1, and the strength of the processed film was measured to be 2.5 kg/cm.

Using the solid polyelectrolyte membrane prepared herein, a single cell was constructed in the same manner as in Example 1, and the terminal voltage relative to the current density was measured. In this case, the current density was 1 A/cm$^2$, and the cell voltage was 0.58 V. Considering the conditions for driving fuel cells in actual operation, the membrane prepared herein was dipped in hot water at 90° C. for 1000 hours, and its strength was measured to be 2.4 kg/cm, which was lower than the original strength. From the data obtained in Example 1 and Comparative Example 1, it is known that the solid polyelectrolyte membrane of Example 1 has a higher strength than Comparative Example 1, and that the capacity of the fuel cell comprising the former is comparable to that comprising the latter.

TABLE 1

| | Tensile Strength (unit: kg/cm) | |
|---|---|---|
| | Initial Value | After Hot-Water Dipping Test |
| Example | 5.0 | 5.0 |
| Comparative Example | 2.5 | 2.4 |

In the membrane of the invention, the reinforcing whisker fibers are firmly adhered and fixed to the polymer. Therefore, when the membrane is in a fuel cell, the whisker fibers do not peel off from the membrane and the mechanical strength of the membrane is not reduced while the fuel cell is driven. In addition, since the fluorine polymer used in producing the membrane is a thermoplastic polymer, the membrane of the polymer may have any desired thickness.

Obviously, additional modifications and variations of the present invention are possible in light of the above teachings. It is therefore to be understood that within the scope of the appended claims, the invention may be practiced otherwise than as specifically described herein.

The Priority document of the present application, Japanese Patent Application No. 10(1998)-7918, filed on Jan. 19, 1998, is hereby incorporated by reference.

What is claimed is:

1. A solid polyelectrolyte membrane comprising a copolymer including
   a fluorine polymer;
   a hydrocarbon polymer grafted to said fluorine polymer; and
   fibers chemically bonded by a silane coupling agent to said fluorine polymer, wherein said copolymer further comprises sulfonic acid groups.

2. The membrane of claim 1, wherein said coupling agent is represented by:

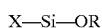

wherein:

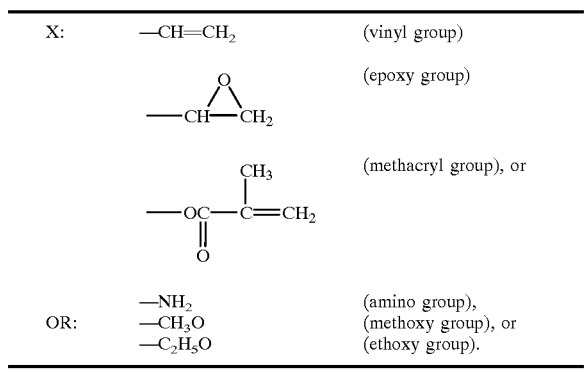

3. A fuel cell, comprising:
   (i) a positive electrode,
   (ii) a negative electrode, and
   (iii) the membrane of claim 2, between said positive electrode and said negative electrode.

4. The membrane of claim 1, wherein said fibers have a fiber diameter of from 0.1 to 10 μm and an aspect ratio of from 10 to 1000.

5. A fuel cell, comprising:
   (i) a positive electrode,
   (ii) a negative electrode, and
   (iii) the membrane of claim 4, between said positive electrode and said negative electrode.

6. The membrane of claim 1, wherein the amount of said fibers is from 10 to 30 parts by weight relative to 100 parts by weight of said hydrocarbon polymer and said fluorine polymer.

7. A fuel cell, comprising:
   (i) a positive electrode,
   (ii) a negative electrode, and
   (iii) the membrane of claim 6, between said positive electrode and said negative electrode.

8. The membrane of claim 1, wherein said fibers are selected from the group consisting of potassium titanate, calcium silicate, aluminum borate, sepiolite, silicon carbide and mixtures thereof.

9. A fuel cell, comprising:
   (i) a positive electrode,
   (ii) a negative electrode, and
   (iii) the membrane of claim 8, between said positive electrode and said negative electrode.

10. The membrane of claim 1, wherein said fluorine polymer has the formula:

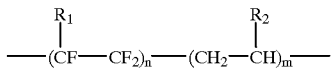

wherein $R_1$ represents a fluorine atom, or a fluoroalkyl group having from 1 to 3 carbon atoms; $R_2$ represents a hydrogen atom, or an alkyl group having from 1 to 3 carbon atoms; m represents an integer of 1 or more; and n represents an integer of 1 or more, and said hydrocarbon polymer has the formula:

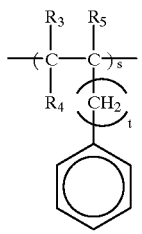

wherein $R_3$, $R_4$ and $R_5$ each represent a hydrogen atom, or an alkyl group having from 1 to 3 carbon atoms; s represents an integer of 1 or more; and t represents 0 or an integer of 1 or more.

11. A fuel cell, comprising:
(i) a positive electrode,
(ii) a negative electrode, and
(iii) the membrane of claim 10, between said positive electrode and said negative electrode.

12. A vehicle, comprising the fuel cell of claim 11.

13. A fuel cell, comprising:
(i) a positive electrode,
(ii) a negative electrode, and
(iii) the membrane of claim 1, between said positive electrode and said negative electrode.

14. A vehicle, comprising the fuel cell of claim 13.

15. The membrane of claim 1, wherein 1 to 5 parts by weight of said silane coupling agent is chemically bonded to 100 parts by weight of said fluorine polymer.

16. A method of making a solid polyelectrolyte membrane, the method comprising
reacting a silane coupling agent with fibers and a fluorine polymer to form a reinforced fluorine polymer;
graft-copolymerizing a hydrocarbon polymer to said reinforced fluorine polymer to produce a copolymer; and
introducing sulfonic acid groups into said copolymer.

17. The method of claim 16, wherein said silane coupling agent is represented by:

X—Si—OR wherein:

| X: | —CH=CH₂ | (vinyl group) |
|---|---|---|
| | 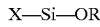 —CH—CH₂ | (epoxy group) |
| | —OC—C(CH₃)=CH₂ ‖ O | (methacryl group), or |
| | —NH₂ | (amino group), |
| OR: | —CH₃O | (methoxy group), or |
| | —C₂H₅O | (ethoxy group). |

18. The method of claim 16, wherein said silane coupling agent reacts with said fluorine polymer and said fibers, and said silane coupling agent is added in an amount of 1 to 5 parts by weight relative to 100 parts by weight of said fluorine polymer.

19. The method of claim 16, wherein said fibers have a fiber diameter of from 0.1 to 10 μm and an aspect ratio of from 10 to 1000.

20. The method of claim 16, wherein said fibers are added in an amount of 10 to 30 parts by weight relative to 100 parts by weight of said fluorine polymer.

21. The method of claim 16, wherein said fibers are selected from the group consisting of potassium titanate, calcium silicate, aluminium borate, sepiolite silicon carbide and mixtures thereof.

22. The method of claim 16, wherein said fluorine polymer is represented by:

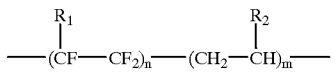

wherein $R_1$ represents a fluorine atom, or a fluoroalkyl group having from 1 to 3 carbon atoms; $R_2$ represents a hydrogen atom, or an alkyl group having from 1 to 3 carbon atoms; m represents an integer of 1 or more; and n represents an integer of 1 or more.

23. The method of claim 22, wherein said hydrocarbon polymer is represented by:

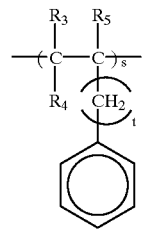

wherein $R_3$, $R_4$ and $R_5$ each represent a hydrogen atom, or an alkyl group having from 1 to 3 carbon atoms; s represents an integer of 1 or more; and t represents 0 or an integer of 1 or more.

24. A solid polyelectrolyte membrane for a fuel cell, prepared by the method of claim 23.

25. A fuel cell, comprising:
(i) a positive electrode,
(ii) a negative electrode, and
(iii) the membrane of claim 24, between said positive electrode and said negative electrode.

26. A process for forming fuel cell, comprising:
preparing a membrane by the process of claim 23; followed by sandwiching said membrane between positive and negative electrodes.

27. The method of claim 16, wherein said hydrocarbon polymer is represented by:

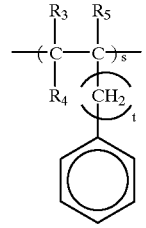

wherein $R_3$, $R_4$ and $R_5$ each represent a hydrogen atom, or an alkyl group having from 1 to 3 carbon atoms; s represents an integer of 1 or more; and t represents 0 or an integer of 1 or more.

28. A solid polyelectrolyte membrane for a fuel cell, prepared by the method of claim 16.

29. A fuel cell, comprising:

(i) a positive electrode, (ii) a negative electrode, and (iii) the membrane of claim 28, between said positive electrode and said negative electrode.

30. A solid polyelectrolyte membrane for a fuel cell, prepared by the method of claim 16.

31. A fuel cell, comprising:

(i) a positive electrode, (ii) a negative electrode, and (iii) the membrane of claim 30, between said positive electrode and said negative electrode.

32. A process for forming fuel cell, comprising:

preparing a membrane by the process of claim 16; followed by sandwiching said membrane between positive and negative electrodes.

\* \* \* \* \*